(12) United States Patent
Helferty et al.

(10) Patent No.: US 11,922,487 B2
(45) Date of Patent: Mar. 5, 2024

(54) SYSTEM AND METHOD FOR GENERATING A PERSONALIZED CONCERT PLAYLIST

(71) Applicant: Spotify AB, Stockholm (SE)

(72) Inventors: Nikhil Helferty, New York, NY (US);
Ariel Marcus, New York, NY (US);
Ritwik Dey, New York, NY (US);
Steve Shirley, New York, NY (US)

(73) Assignee: Spotify AB, Stockholm (SE)

(*) Notice: Subject to any disclaimer, the term of this patent is extended or adjusted under 35 U.S.C. 154(b) by 0 days.

(21) Appl. No.: 18/153,119

(22) Filed: Jan. 11, 2023

(65) Prior Publication Data

US 2023/0222563 A1   Jul. 13, 2023

Related U.S. Application Data

(63) Continuation of application No. 17/466,883, filed on Sep. 3, 2021, now abandoned, which is a continuation of application No. 16/680,063, filed on Nov. 11, 2019, now Pat. No. 11,113,749, which is a continuation of application No. 15/658,006, filed on Jul. 24, 2017, now Pat. No. 10,475,108.

(51) Int. Cl.
*G06Q 30/00* (2023.01)
*G06Q 30/0601* (2023.01)
*G06F 16/438* (2019.01)

(52) U.S. Cl.
CPC ..... *G06Q 30/0633* (2013.01); *G06F 16/4387* (2019.01)

(58) Field of Classification Search
CPC .................................................. G06Q 30/0633
See application file for complete search history.

(56) References Cited

U.S. PATENT DOCUMENTS 8,935,279 B2 * 1/2015 Skeen .................. G06F 16/639
707/754
2009/0248702 A1 * 10/2009 Schwartz ............ H04L 12/2812
(Continued)

OTHER PUBLICATIONS

Storch, C. (Aug. 24, 2008). 5 Things to Learn About . . . ticketmaster. Chicago Tribune Retrieved from https://search.proquest.com/docview/420766404?accountid=14753.*

(Continued)

*Primary Examiner* — Kathleen Palavecino
(74) *Attorney, Agent, or Firm* — Morgan, Lewis & Bockius LLP (57) ABSTRACT

A method, which may be performed at an electronic device, such as a media server associated with a media-providing service, causes a set of media items to be provided to a user based on identifying performance listings relevant to the user. The method includes determining a list of one or more performance listings of artists relevant to a user based on a media consumption history of the user, the media consumption history describing media content items previously delivered to the user by a media content server, and a listening profile of a second user, distinct from the first user, the listening profile identifying media content and artists played by the second user via the media content server. The method includes providing one or more media items to the user, the one or more media items selected based on the list of one or more performance listings.

18 Claims, 6 Drawing Sheets

(56) References Cited

U.S. PATENT DOCUMENTS

| | | | | |
|---|---|---|---|---|
| 2011/0040657 | A1* | 2/2011 | Roswell | G06F 16/958 |
| | | | | 707/E17.046 |
| 2012/0304064 | A1* | 11/2012 | Delaney, Jr. | G06F 16/639 |
| | | | | 715/716 |
| 2014/0095333 | A1* | 4/2014 | Zises | G06Q 30/06 |
| | | | | 705/26.1 |
| 2016/0104078 | A1 | 4/2016 | Jorges et al. | |
| 2016/0357863 | A1* | 12/2016 | Albalat | G06F 16/4387 |
| 2019/0155840 | A1* | 5/2019 | O'Konski | G06F 16/636 |

OTHER PUBLICATIONS

Storch, C. (2008, Aug. 24). 5 Things to Learn About . . . ticketmaster. Chicago Tribune Retrieved from https://search.proquest.com/docview/420766404?accountid=14753.*

Grace, Anna; "SiriusXM's Pandora Partners with Ticketmaster", IQ Magazine, published Apr. 30, 2019, retrieved from hittps://www.iq-mag.net/2019/04/siriusxm-pandora-pariners-ticketmaster/ on May 5, 2021, 4 pages.

Helferty, Office Action, U.S. Appl. No. 17/466,883, dated Oct. 11, 2022, 13 pgs.

Helferty, Office Action, U.S. Appl. No. 16/680,063, dated Oct. 27, 2020, 13 pgs.

Helferty, Notice of Allowance, U.S. Appl. No. 16/680,063, dated May 11, 2021, 11 pgs.

Helferty, Office Action, U.S. Appl. No. 15/658,006, dated Oct. 17, 2017, 16 pgs.

Helferty, Final Office Action, U.S. Appl. No. 15/658,006, dated Mar. 27, 2018, 18 pgs.

Helferty, Office Action, U.S. Appl. No. 15/658,006, dated Oct. 18, 2018, 17 pgs.

Helferty, Noiice of Allowance U.S. Appl. No. 15/658,006, dated Jul. 8, 2019, 10 pgs.

Perreault, Olivia; "Pandora Reveals Partnership With Ticketmaster Following Eventbrite Integration", published Apr. 30, 2019, retrieved from https://www.ticketnews.corn/2019/04/pandora-reveals-partnership-with-ticketmaster/ on May 5, 2021, 5 pages.

Resnikoff, Paul; "Post-Ticketfly, Pandora Integrates Ticketmaster Shows Into Its Artist Streams", published Apr. 30, 2019, retrieved from https://www.digitalmusicnews.com/2019/04/30/pandora-ticketmasted on May 5, 2021, 9 pages.

The TicketingBusiness; "Pandora Signs Ticketmaster Deal", published Apr. 30, 2019, retrieved from https-J/www_iheticketbusiness.com/2019/04/30/pandora-signs-ticketmaster-deal/ on May 5, 2021, 2 pages.

Storch, C. (Aug. 24, 2008). 5 Things to Learn About . . . Ticketmaster, Chicago Tribune, retrieved from https://search.proquest.com/docview/420766404?accountid=14753, 3 pgs.

* cited by examiner

SYSTEM AND METHOD FOR GENERATING A PERSONALIZED CONCERT PLAYLIST

CLAIM OF PRIORITY

This application is a continuation of U.S. Patent Application titled "SYSTEM AND METHOD FOR GENERATING A PERSONALIZED CONCERT PLAYLIST", application Ser. No. 17/466,883, filed Sep. 3, 2021; which is a continuation of U.S. Patent Application titled "SYSTEM AND METHOD FOR GENERATING A PERSONALIZED CONCERT PLAYLIST", application Ser. No. 16/680,063, filed Nov. 11, 2019 and subsequently issued as U.S. Pat. No. 11,113,749 on Sep. 7, 2021; which is a continuation of U.S. Patent Application titled "SYSTEM AND METHOD FOR GENERATING A PERSONALIZED CONCERT PLAYLIST", application Ser. No. 15/658,006, filed Jul. 24, 2017 and subsequently issued as U.S. Pat. No. 10,475,108 on Nov. 12, 2019; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to providing digital media content, and are particularly related to a system and method for providing a personalized concert playlist, or access to media content associated with an artist scheduled for performance, and for providing access to information about the scheduled performance.

BACKGROUND

Today's consumers enjoy the ability to access a tremendous amount of media content, such as music and videos, using a wide variety of media devices. Digital media content environments, for example media streaming services such as Spotify, enable users to stream music content that complements their lifestyle, while commuting, exercising, relaxing at home, or engaging in other types of activities.

As the music industry shifts toward streaming services and away from physical media, artists have begun to derive a greater share of their earnings through concerts and other performances. To the extent that streaming services can promote these concerts and performances or simply increase awareness of these concerts and performances, a streaming service can engender goodwill both with artists that rely on ticket sale volume to maximize earnings and with the streaming service user base that wants to stay informed and wants to experience their favorite artists perform live.

Traditional media content environments and streaming services are generally operated to provide playback of media content while providing access to concert and performance information via dedicated artist pages or dedicated concert listing pages. In general, most people are not aware when their favorite artists are playing concerts in their area. Even regular concert goers that visit dedicated artist and concert listing pages often fail to keep up with updated concert listings and often miss opportunities for purchasing tickets. Further, people are typically not aware that an upcoming concert might be something they would enjoy if they are not familiar with the artist. Artists lose potential revenue when a venue is under-booked, especially when a venue is under-booked due to lack of promotion and visibility to a potential audience.

SUMMARY

In accordance with an embodiment, described herein is a system and method for providing access to media content associated with an artist scheduled for performance. A media application enables display of a playlist personalized for a user, based on a location of the user, a list of artists scheduled for performance, and a media consumption history of the user. An input action causes a media server to populate the playlist with media content. The media server determines the location of the user, retrieves those performance listings within a predetermined distance, retrieves the media consumption history of the user, filters the performance listings based on the media consumption history to obtain a set of artists having performance listings relevant to the user, selects media content items associated with each artist, and organizes the selected media content items within the playlist.

DETAILED DESCRIPTION

As described above, digital media content environments, for example media streaming services such as Spotify, enable users to stream music content that complements their lifestyle, while commuting, exercising, relaxing at home, or engaging in other types of activities, while providing access to information such as concert and performance information via dedicated artist pages or dedicated concert listing pages. However, most users are not aware that concert and performance information is available, forget that concert and performance information is available, or simply do not access concert and performance information often enough to be aware that concert and performances that may be of interest to them are scheduled for their area.

In accordance with an embodiment, described herein is a system and method for providing access to media content associated with an artist scheduled for performance. A media application enables display of a playlist personalized for a user, based on a location of the user, a list of artists scheduled for performance, and a media consumption history of the user. An input action causes a media server to populate the playlist with media content. The media server determines the location of the user, retrieves those performance listings within a predetermined distance, retrieves the media consumption history of the user, filters the performance listings based on the media consumption history to obtain a set of artists having performance listings relevant to the user, selects media content items associated with each artist, and organizes the selected media content items within the playlist.

Digital Media Content Environments

Figure 1:
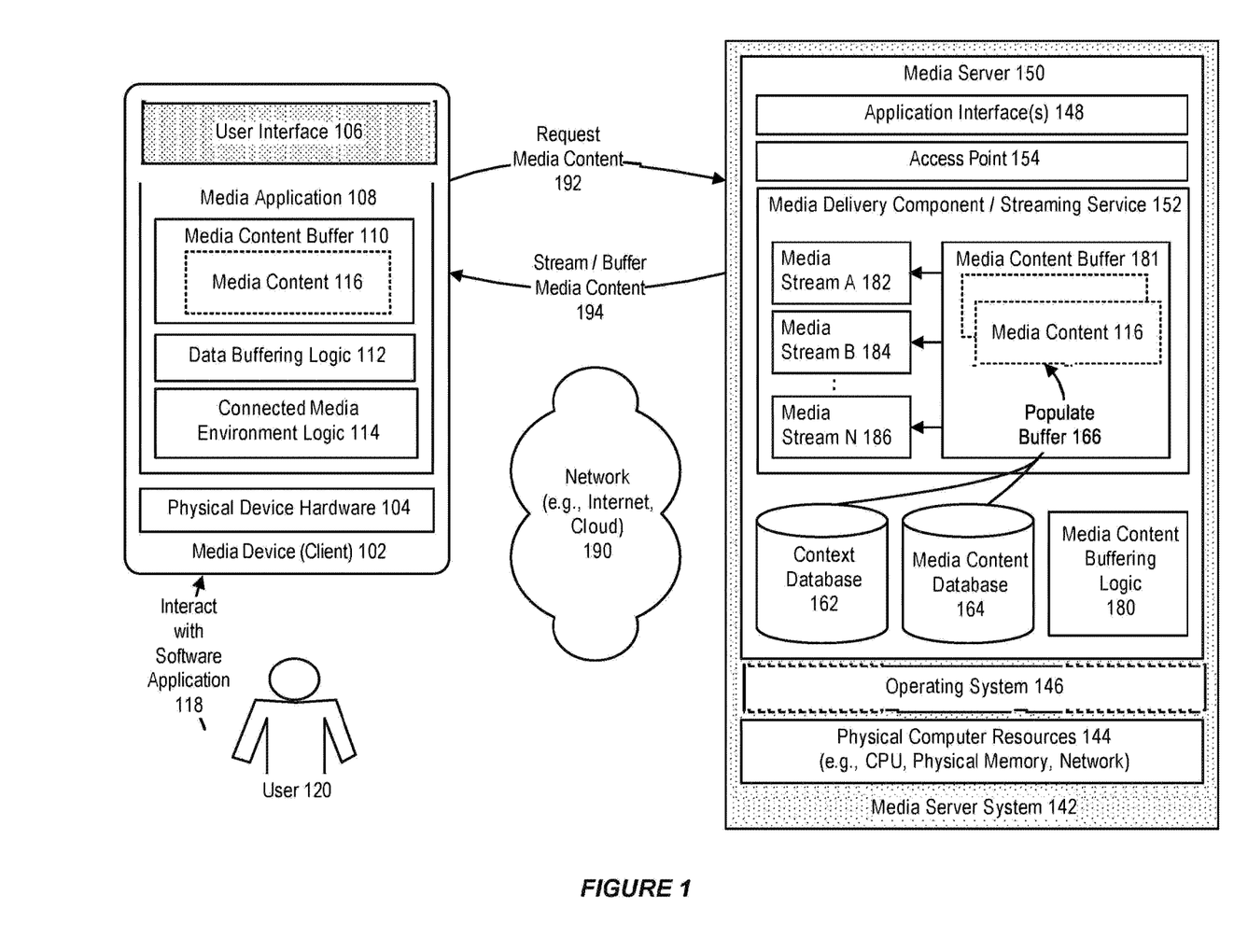
FIG. 1 illustrates an example of a system for providing media content, in accordance with an embodiment.

FIG. 1 illustrates an exemplary digital media content environment, in accordance with an embodiment.

As illustrated in FIG. 1, in accordance with an embodiment, a media device 102, operating as a client device, can receive and play media content provided by a media server system 142 (media server), or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 114, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system 146 or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, say from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 120 can interact 118 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 192 to the media server, via the server's application interface. The media server can populate its server-side media content buffer at the server, with corresponding media content 116, including one or more streams of media content data, and can then communicate 194 the selected media content to the user's media device, or to a controlled device as appropriate, where it can be buffered in a client-side media content buffer for playing at the device.

In accordance with an embodiment, and as further described below, the system can include a server-side media gateway or access point 154, provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "access-point", which forwards client requests to other servers, such as sending one or more metadataproxy requests to one of several metadataproxy machines, on behalf of the client or end user.

Figure 2:
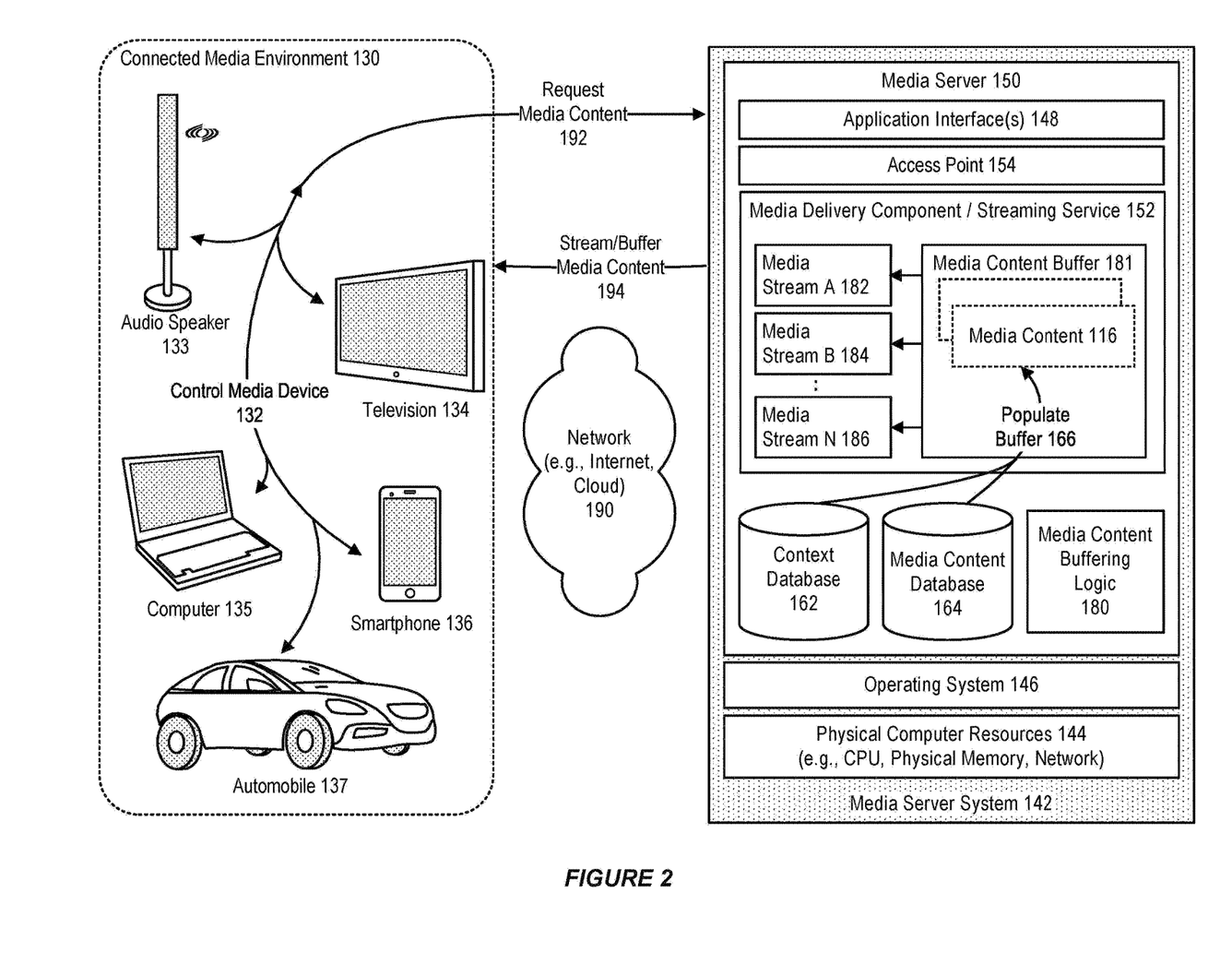
FIG. 2 illustrates an exemplary connected media environment, in accordance with an embodiment.

FIG. 2 further illustrates an example of a system for providing media content, in accordance with an embodiment.

As illustrated in FIG. 2, in accordance with an embodiment, a connected media environment 130, for example a Spotify Connect environment, enables communication between a client device and the server-side access point in a connected manner from the perspective of a user. Examples of the types of media device that can be provided within a connected media environment include audio speakers 133, televisions 134, computers 135, smartphones 136, and in-car entertainment systems 137, or other types of media device.

In accordance with an embodiment, a client device having an application user interface can act as a controlling client device, to control 132 the playback of media content at a controlled device. In accordance with an embodiment, a client device can itself act as a media gateway or access point, for use by other devices within the system for providing media content.

In accordance with an embodiment, a controlled device can also include a media application, which in the case of an audio speaker, television or similar device can be included within the device itself as firmware logic, or within, for example, a separate set-top box or similar after-market device.

As described above, in accordance with an embodiment, a user can interact with the user interface at a client device, and issue requests to access media content, for example the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request 192 to change a media channel, in response to which the media server can switch the media channel at the controlled device, and thereafter continue to stream or buffer media content 194 for the switched channel, at the controlled device.

As described above, in some instances, a portion of the media content can be pre-buffered at the controlled device, so that the switching to the channel at the controlled device operates in a seamless manner.

Personalized Concert Playlists

In accordance with an embodiment, the system provides access to media content associated with an artist or artists scheduled to perform at a concert via a personalized concert playlist (also referred to as a "custom playlist"). Typically, a concert is a musical performance given in public by a performer or several performers. However, in other embodiments a personalized concert playlist can include media content from artists scheduled for other types of performance and is not necessarily limited to media content from artists scheduled for a musical performance. For example, a personalized concert playlist can include media content for an artist or artists scheduled to perform a recital, a stand-up comedy set, sketch comedy, a poetry reading, a speaking engagement, a theatrical production and/or any event at which a performer or group of performers presents one or more works to an audience.

Figure 3:
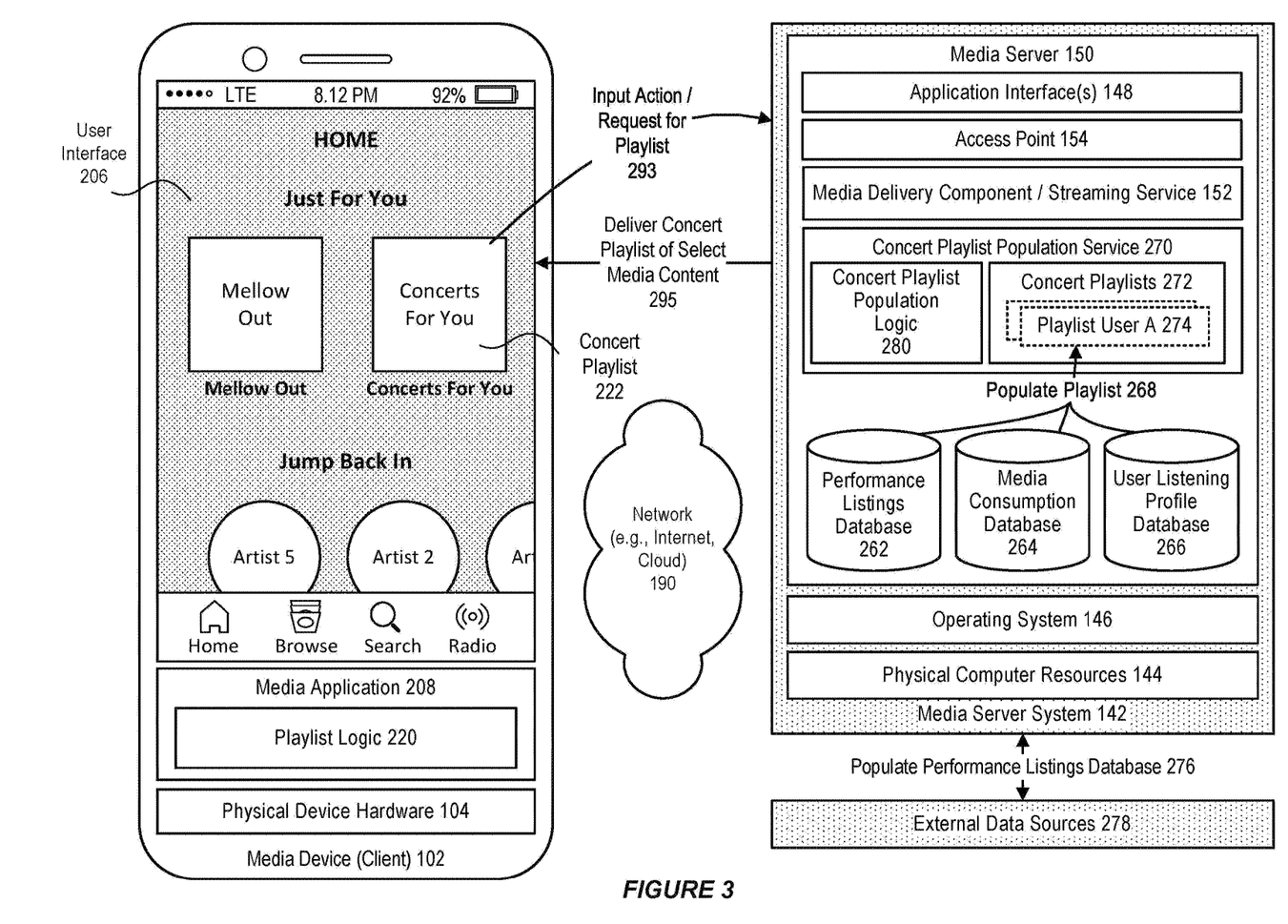
FIG. 3 illustrates a system for providing access to media content associated with an artist scheduled for performance using a digital media content environment, in accordance with an embodiment.

FIG. 3 illustrates a system for providing access to media content associated with an artist scheduled for performance, using a digital media content environment, in accordance with an embodiment.

As illustrated in FIG. 3, in accordance with an embodiment, a media application 208 enables display of and access to a personalized concert playlist 222 via a user interface 206 configured according to a playlist logic 220. As illustrated, the media application is launched on a media device (client) 102 comprising a smartphone, but in other embodiments the application can be launched on a media device comprising a personal computer system, a handheld entertainment device, a tablet device, a television, an audio speaker, an in-car entertainment system, or any other type of electronic or media device that is adapted or able to prepare media content for presentation, control the presentation of media content, and/or play or otherwise present media content.

In accordance with an embodiment, the personalized concert playlist can be displayed on a "home" screen loaded upon launching the media application or alternatively in some other location of the media application accessible via the user interface. The concert playlist is personalized for an account logged into the media application. As described herein, an account will be associated with "a user", although it will be understood that an account logged into the media application may be accessed by multiple individuals via a media device and a personalized concert playlist may be generated based on the activity of multiple individuals.

In accordance with an embodiment, a media server populates the personalized concert playlist using a concert playlist population service 270 comprising a concert playlist population logic 280 operating on data accessed from several different data sources. One data source is a performance listing database 262 that is built using performance listing feeds made available by external sources 278 such as concert promoters, agents of concert promoters, e.g. Ticketmaster, or concert discovery services, e.g. Songkick. External sources of performance listings are collectively referred to herein as "partners".

In accordance with an embodiment, the system can pull the performance listings by querying the feed of a partner via an application programming interface (API) associated with the partner and in return receiving metadata related to the performance listings. The system can query these feeds at regular intervals, for example daily, or when prompted, for example by an administrator. Alternatively, partners can push performance listings to the system. The metadata received from the feeds are conditioned to remove duplicate listings and to match artist names identified by the media server database with the artist names identified from the feeds. The conditioned data are ingested into the performance listings database 276.

In accordance with an embodiment, the personalized concert playlist is populated by the media server in response to an input action 293 of a user. The input action can include, for example, the user accessing the personalized concert playlist via the user interface. The media server can respond to the user accessing the personalized concert playlist by populating the playlist in near-real time with selected media content items for a set of artists each scheduled for a performance and transmitting the playlist 295 to the media device, as well as transmitting to the media device information and/or links to information related to each performance for access by the user via the concert playlist.

In accordance with an embodiment, the input action can optionally be limited by the media server so that re-population of the personalized concert playlist in response to accessing the playlist occurs only after some fixed reset time or after some period elapses subsequent to a prior input action. For example, the personalized concert playlist can be re-populated upon receiving the input action after twenty-four hours have elapsed from the prior population of the personalized concert playlist. Within the twenty-four hour window, the personalized concert playlist that was previously populated is presented to the user upon the user accessing the personalized concert playlist.

In accordance with an embodiment, upon receiving the input action from the user the media server determines a location of the user. The location of the user can be manually set by the user within the media application, or can be ascertained by the media server. The media server can ascertain location by identifying the IP address from which the media server is accessed by the media device. The media server can then query a third party digital mapping company, e.g. MaxMind, which provides location data for IP addresses. Alternatively, the media application can use capabilities of the media device itself. For example, for an Apple iOS device, location services functionality can be enabled for use by the media application. Location services enables use of GPS signals and cellular location to ascertain a user's location.

In accordance with an embodiment, once the media server determines a location of the user, the media server can query the performance listings database to fetch all upcoming performances relevant to the location. The upcoming performances can be limited to those scheduled to occur within a predefined window of time (e.g. two months) from the current date or can include all upcoming scheduled performances. A performance is deemed relevant to the location based on the venue hosting the performance.

In an embodiment, venues are grouped together based on a city or region so that a location within the city or region receives listings for the grouped venues. The geographic coverage can vary based on the city or region and can be predefined by the system.

For example, a location in the Williamsburg neighborhood of Brooklyn, New York, may have geographic coverage limited to venues in the Manhattan and Brooklyn boroughs, while a location in the Deep Ellum neighborhood of Dallas, Texas, may have geographic coverage that include venues in all of Dallas as well as the surrounding cities of Fort Worth and Arlington. In an embodiment, the user can adjust a search setting to expand or contract the geographic coverage via input at the user interface.

In an alternative embodiment, performances can be associated with the location based on a geographic distance of a venue hosting the performance from the location. The geographic distance of a venue from the location can be fixed to a specific radius, e.g. twenty miles, predefined by the user or predefined by the media server. The radius can vary based on the location and/or a search setting.

In accordance with an embodiment, once the upcoming performances associated with the location are retrieved by the media server, the media server can access a user listening profile database 266 to obtain a listening profile generated for and associated with the user. A listening profile generated for a user reflects the user's affinity for specific artists, specific media content items, specific music and media genres, and other characteristics of media content. The listening profile can be generated based on metadata associated with the user's interaction with the media application.

Such metadata can include, but are not limited to, the user's streaming history, the user's search history, the user's selection of specific media content items, a list of media content items and artists that have been "starred" or otherwise rated by the user, media content items that have been "saved" or otherwise tagged by the user, etc.

Listening profiles and listening profile logic (not shown) used to generate listening profiles are not necessarily exclusively used by systems for providing access to media content associated with an artist scheduled for performance in accordance with present embodiments and may be described elsewhere in greater detail. Algorithms, processes, techniques or methods performable by the system for generating the listening profile of the user based on metadata can vary myriad different ways and can change over time. Media content can be reflected positively or negatively when generating a listening profile of a user based on interpretation of the metadata. For example, a "starred" media content item, and optionally the associated artist, can be reflected more positively when generating a listening profile than a media content item that is streamed or otherwise played only a handful of times. Alternatively, a previously "starred" media content item that is subsequently "unstarred" can be interpreted as media content for which the user has lost interest and reflected more negatively when generating a listening profile than a media content item and associated artist that is streamed or otherwise played a handful of times. These examples are merely exemplary.

In accordance with an embodiment, once the listening profile of the user is received by the concert playlist population service, the concert playlist population logic can identify an initial list of artists to be used for filtering the performance listings received from the performance listings database. Optionally, the list can be ranked to reflect the relative affinity of the user for the artist.

In accordance with an embodiment, the initial list of artists identified via the concert playlist population service can optionally be expanded to include artists the system believes the user may like but that are outside of the scope of the listening profile of the user.

For example, the initial list of artists can be expanded based on a heavily represented genre within the initial list of artists, or based on relationships or similarities between listed artists with other unlisted artists previously identified and recorded by the system. Alternatively, the initial list of artists can be expanded based on analyses of aggregate user data. For example, an analysis of media content played by the user can be compared with media content played by others to identify other profiles with similar tastes to the user and to select artists identified in those other listening profiles to expand the list of artists for filtering the performance playlist data.

In accordance with an embodiment, the performance listing data is filtered using the initial or expanded list of artists to produce performance listings relevant to the user. The artists associated with the performance listings relevant to the user represent a set of artists from which the concert playlist is generated for the user. A concert playlist may be limited in size, containing a maximum number of media content items. If the concert playlist is limited in size, the concert playlist population logic can reduce the set of artists to the maximum number based on some method or process that assigns preference to artists. The method or process can assign preference based on a number of factors, including but not limited to whether the artist is part of the initial list of artists or the expanded list of artists relevant to the user, how the artist is ranked within a list, how popular the artist is within the community of users, and/or how close in time to the current date the performance is scheduled.

In accordance with an embodiment, once the set of artists is selected and pared, where necessary or desired, the media server can access a media consumption database 264 to select a media content item for each of the artists from the set of artists. Optionally, where the set of artists is below the maximum number of media content items for the custom playlist, additional media content items can be selected for one or more of the artists from the set of artists. The media consumption database can include metadata tracking the selection and streamlining of all media content items. Media content items for each artist are selected based on the metadata. The selection of media content items can be made based on a method performed by the custom playlist population logic or by some other module that takes into account factors which can include one or more of total play count (i.e., popularity within the community), total "star" or "like" count, release date, artist preference/selection, reviews and/or review scores (e.g. AllMusic.com track pick, Pitchfork.com Best New Track selection, etc.), play length, availability of a live performance recording, etc.

Once a media content item is selected for each artist from the list of artists, the custom playlist logic can arrange the selected media content items within the playlist. In accordance with an embodiment, the selected media content items can be ordered from first to last (top to bottom in the displayed playlist) in chronological order based on the date of the scheduled performance, with media content items associated with artists scheduled to perform closest to the current date arranged higher in the order of the selected media content items.

Alternatively, it may be desirable to order the selected media content items based on compatibility so that one selected media content item is not paired with another selected media content item with which it is incompatible. Media content items may be incompatible for a number of reasons including incompatible tempo, tone, intensity, style, genre, etc. Alternatively, the selected media content items can be ordered based on a combination of factors including performance listing chronology and compatibility.

While the generation of the custom playlist by querying different databases has been described herein in a particular sequence, this is merely exemplary and presented as such for the sake of clarity. Database queries can be performed in any order. For example, in accordance with an embodiment, the system and method can, upon receiving an input action of a user, initially query the user listening profile database and subsequently query the performance listings database.

In accordance with an embodiment, once the custom playlist is generated, it is delivered to the media device by transmitting the custom playlist from the media server to the media device. The delivered custom playlist includes metadata describing the selected media content items and the ordering of the custom playlist, but also includes metadata comprising information related to the performance listing, and/or links to information related to the performance listing. The custom playlist for the user 274 is stored at the media server along with custom playlists 272 for other users.

In an alternative embodiment, the custom playlist for the user can be stored locally at the media device and purged from the media server, or alternatively stored both locally at the media device and at the media server. As described above, the custom playlist is generated in near real time in response to the input action by the user. The custom playlist can be generated in under a second of time, with call to the different data sources occurring on the millisecond scale. In alternative embodiments, the custom playlists can be pre-generated for the user base and delivered upon receipt of an input action.

As described above, in an embodiment, a location of the personalized playlist within the media application can be fixed, such as on the home screen. In other embodiments, a location of the personalized playlist within the media application can vary based on one or more factors which can include, for example, frequency of a user accessing the personalized playlist, content of the personalized playlist, promotional events, sponsorship, etc.

For example, if a frequency of the user accessing the personalized playlist or streaming media content via the personalized playlist is high, the personalized playlist can be located in a position that is visible by default upon loading the home screen, such as illustrated in FIG. 3. Conversely, if the user infrequently accesses the personalized playlist, the personalized playlist can be relocated for display in another location, such as on a "browse" screen or on dedicated "concert" or "performance" screen.

Further, in some embodiments, a location of the custom playlist can vary based on the media device accessing the media application. For example, a media application launched on a personal computer may have a different visual layout than the media application logged into the same account but launched on smartphone, where the display screen real estate is more limited. On a personal computer, the media application is presented with sidebars for accessing music. These sidebars can be displayed at all times, and the concert playlist can be pinned to a list of user playlists in one sidebar for access at any time. On a smartphone, the custom playlist may only be displayed on certain menus, such as the home screen, user library screen, playlist screen, etc. Visual layout and location of the custom playlist can change with application format and version, and embodiments as described herein should not be construed as being limited to a specific visual presentation.

In accordance with an embodiment, if the media device does not include a display screen or its display capabilities are limited, then the concert playlist may be accessed by a user using verbal cues.

Figure 4:
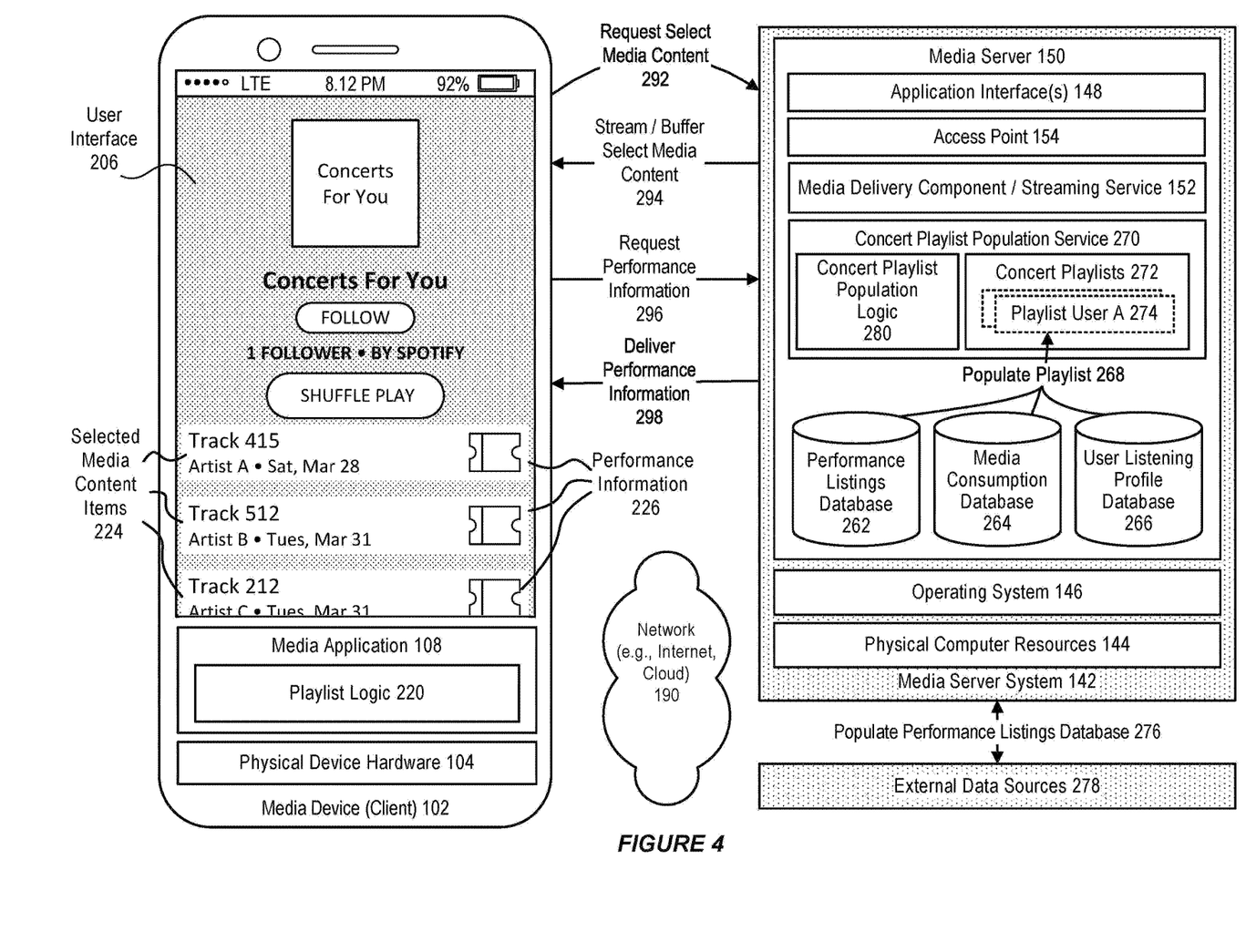
FIG. 4 further illustrates a system for providing access to media content associated with an artist scheduled for performance using a digital media content environment, in accordance with an embodiment.

FIG. 4 illustrates a custom playlist generated by the system for providing access to media content associated with an artist scheduled for performance, using a digital media content environment, in accordance with an embodiment. The custom playlist is accessed by selecting it from the media application. As described above, if selecting the custom playlist is an input action, the custom playlist is generated in near real time and delivered to the media device. Once accessed, the playlist logic displays the selected media content items 224 of the custom playlist in a format for which the custom playlist is programmed, which may be different from other playlists.

For example, the functionality of the custom playlist may be limited relative to other playlists, with functionality such as saving a media content item, adding a media content item to a playlist, adding a selected media content item to a queue, sharing the media content item, etc. being disabled to simplify the playlist interface and to focus a user's interaction with the playlist to either playing a media content item or accessing information about a performance listing associated with a selected media content item. However, in other embodiments some or all of the normal playlist functionality may be enabled.

A user can scroll through the playlist and request playback of any of the selected media content items 292. The selected media content item for which playback is requested is then streamed from the media server 294, or optionally if the selected media content item is available in local memory on the media device the media application can playback the local file. The media server can buffer selected media items that follow the requested selected media content item in the playlist order. Alternatively, the user can request "shuffle play", and the playlist logic (or the media server) will buffer and play the selected media content items according to the method or process appropriate for shuffle play.

In accordance with an embodiment, in addition to displaying the track title and artist of the selected media content items the playlist logic displays performance listing information for each item. As illustrated, a date of the performance listing appears below the track title and next to the artist name, although in other embodiments both the selected media content item information and the performance listing information can be displayed in some other visual format and/or animation. For example, the performance date can appear as a pop-up visual in response to playback of the selected media content item.

As illustrated, in addition to the date of the performance listing, an icon 226 is displayed alongside the selected media content item which when selected prompts the media application to request performance information 296 from the media server. The media server then delivers the performance information 298 to the media device. The performance information can include additional details such as the venue, schedule (e.g., opening acts, headliner), the location, etc., as well as a link to purchase a ticket to the performance. Selecting the link can launch a browser or third party application that provides the ability to purchase a ticket to the performance.

In an alternative embodiment, selecting the icon of a selected media content item can immediately launch a browser or third party application that provides both the full performance information as well as the ability to purchase a ticket to the performance. The functionality of the media application and the interaction with third party applications can depend on the media application format and version, and can vary between media devices, so that a version of the media application launched on a personal computer can be more expansive in the performance listing information displayed within the media application than a version of the media application launched on a smartphone, for example.

In an alternative embodiment, the media application can include functionality to purchase tickets to performances within the media application. Upon selecting the icon, the media application can request ticket information from the media server and can provide purchase and checkout via interaction with the media server. In such an embodiment, the playback of the media content item can optionally continue uninterrupted while the user interacts with the media application to purchase a ticket or access and review additional information about the performance.

Figure 5:
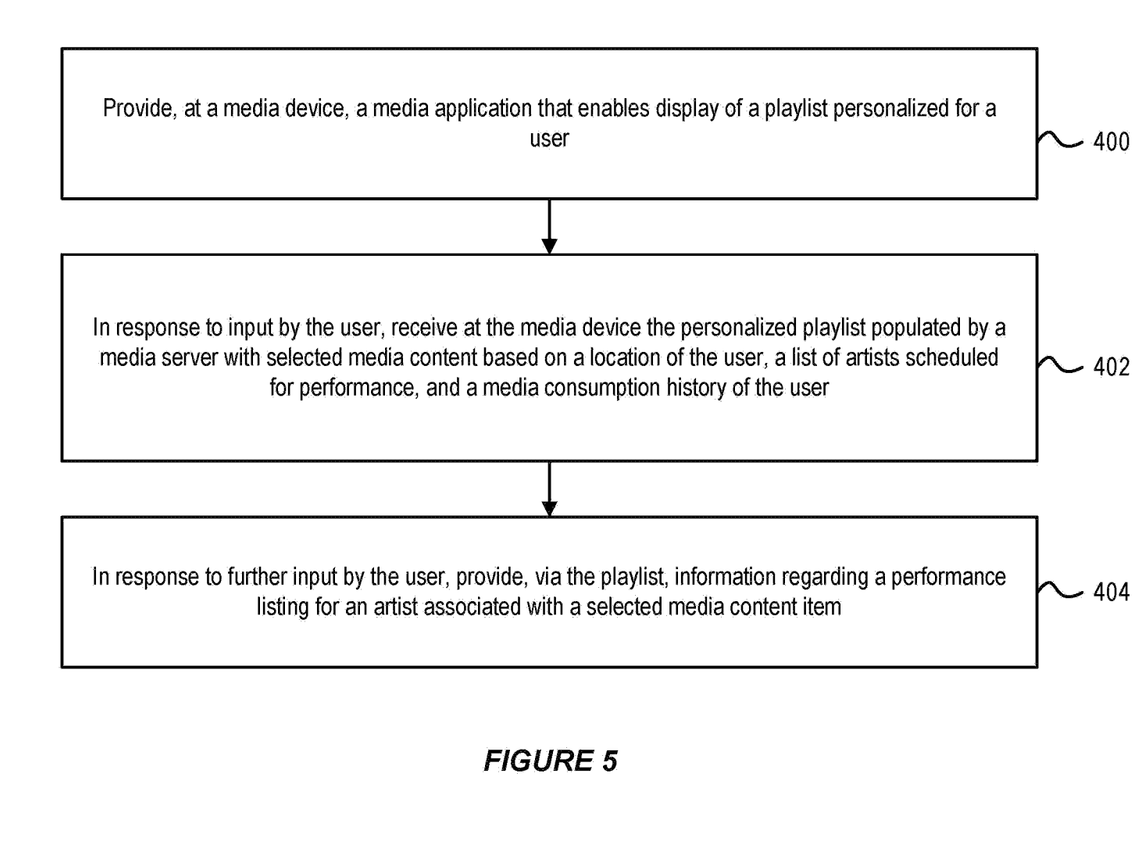
FIG. 5 is a flowchart for a method for providing access to media content associated with an artist scheduled for performance using a digital media content environment, in accordance with an embodiment.

FIG. 5 illustrates a method for providing access to media content associated with an artist scheduled for performance, using a digital media content environment, in accordance with an embodiment.

As illustrated in FIG. 5, at step 400, a media device and media application are provided for use that enables display of a playlist personalized for a user.

At step 402, in response to input by the user, the media device receives the personalized playlist populated by a media server with selected media content based on a location of the user, a list of artists scheduled for performance, and a media consumption history of the user.

At step 404, in response to further input by the user information regarding a performance listing for an artist associated with a selected media content item is provided to the user via the playlist.

Figure 6:
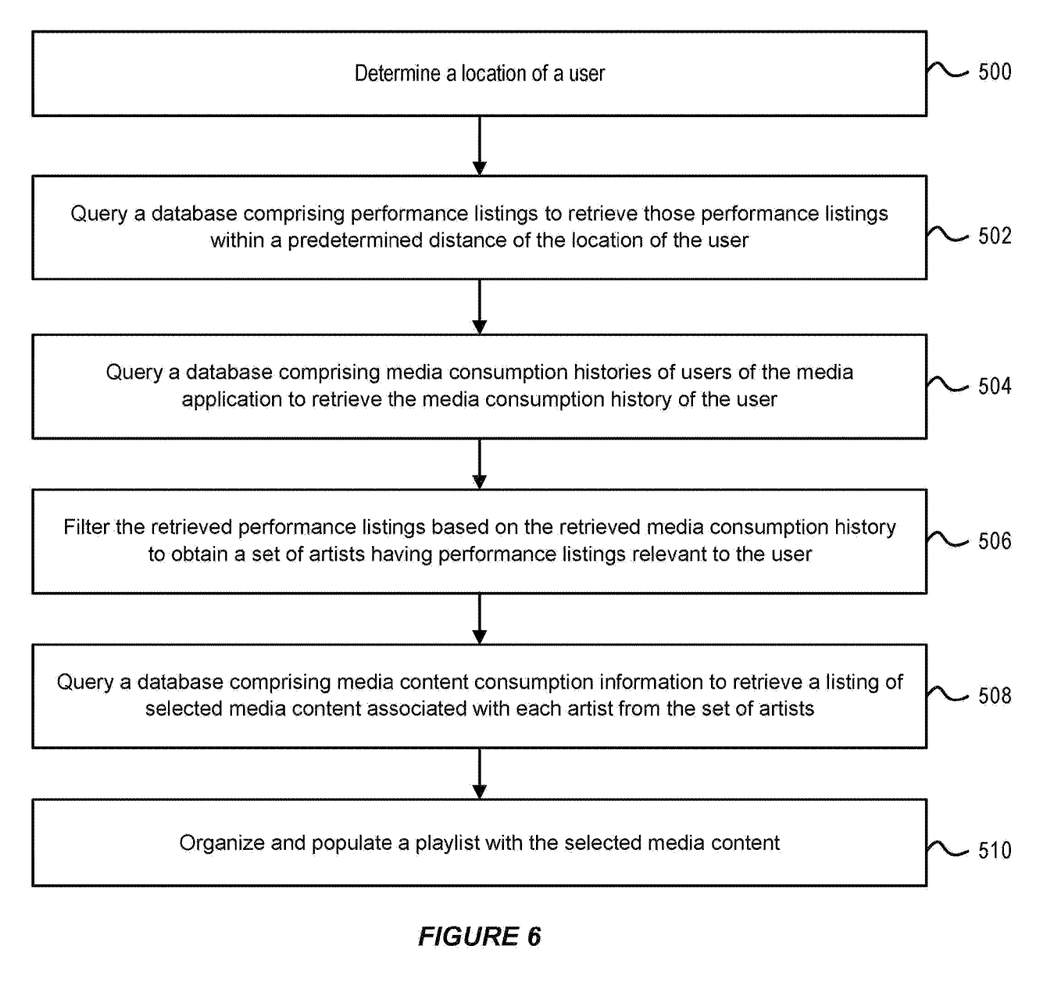
FIG. 6 is a flowchart for a method for populating a playlist for providing access to media content associated with an artist scheduled for performance using a digital media content environment, in accordance with an embodiment.

FIG. 6 illustrates a method for populating a personalized playlist including selected media content items associated with an artist scheduled for performance, using a digital media content environment, in accordance with an embodiment.

As illustrated in FIG. 6, at step 500, the media server determines a location of the user.

At step 502, the media server queries a database comprising performance listings to retrieve those performance listings within a predetermined distance of the location of the user.

At step 504, the media server queries a database comprising media consumption histories of users of the media application to retrieve the media consumption history of the user.

At step 506, the media server filters the retrieved performance listing based on the retrieved media consumption history of the user to obtain a set of artists having performance listings relevant to the user.

At step 508, the media server queries a database comprising media content consumption information to retrieve a listing of selected media content associated with each artist from the set of artists.

At step 510, the media server organizes and populates a personalized playlist for the user with the selected media content.

The above examples of generated personalized concert playlists providing access to media content associated with an artist scheduled for performance as well as information for the performance and other features are provided by way of example.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method, comprising:
   determining a list of one or more performance listings of upcoming performances of artists relevant to a first user based on:
      a media consumption history of the first user, the media consumption history describing media content items previously delivered to the first user by a media content server; and
      a listening profile of a second user, distinct from the first user, the listening profile identifying media content and artists played by the second user via the media content server; and
   providing one or more media items to the first user, the one or more media items selected based on the list of one or more performance listings of the upcoming performances of artists, as determined to be relevant to the first user based on the media consumption history of the first user and the listening profile of the second user.

2. The method of claim 1, wherein the determination of the list of one or more performance listings is based on a plurality of other users, including the second user, having listening histories similar to the first user.

3. The method of claim 1, further comprising:
   adding a first performance to the list of one or more performance listings based on the media consumption history of the first user;
   identifying, via the listening profile of the second user, an additional artist associated with a second performance listing, distinct from the first performance listing; and
   adding the second performance listing to the list of one or more performance listings.

4. The method of claim 1, further comprising:
   before providing the one or more media items to the first user, ordering the one or more media items based on a listing chronology of the one or more performance listings.

5. The method of claim 1, wherein the one or more performance listings correspond to performances scheduled to occur within a predefined window from a current date.

6. The method of claim 1, wherein providing the one or more media items to the first user includes:
   for each respective media item of the one or more media items:
      while the respective media item is being played back, displaying performance information associated with a respective performance listing corresponding to the respective media item.

7. A media server that provides access to media items associated with artists, comprising:
   one or more processors;
   memory storing one or more programs, including instructions for:
      determining a list of one or more performance listings of upcoming performances of artists relevant to a first user based on:

a media consumption history of the first user, the media consumption history describing media content items previously delivered to the first user by a media content server; and a listening profile of a second user, distinct from the first user, the listening profile identifying media content and artists played by the second user via the media server; and providing one or more media items to the first user, the one or more media items selected based on the list of one or more performance listings of the upcoming performances of artists, as determined to be relevant to the first user based on the media consumption history of the first user and the listening profile of the second user.

8. The media server of claim 7, wherein the determination of the list of one or more performance listings is based on a plurality of other users, including the second user, having listening histories similar to the first user.

9. The media server of claim 7, wherein the memory further includes instructions for:

adding a first performance to the list of one or more performance listings based on the media consumption history of the first user;

identifying, via the listening profile of the second user, an additional artist associated with a second performance listing, distinct from the first performance listing; and adding the second performance listing to the list of one or more performance listings.

10. The media server of claim 7, wherein the memory further includes instructions for:

before providing the one or more media items to the first user, ordering the one or more media items based on a listing chronology of the one or more performance listings.

11. The media server of claim 7, wherein the one or more performance listings correspond to performances scheduled to occur within a predefined window from a current date.

12. The media server of claim 7, wherein providing the one or more media items to the first user includes:

for each respective media item of the one or more media items:

while the respective media item is being played back, displaying performance information associated with a respective performance listing corresponding to the respective media item.

13. A non-transitory computer-readable storage medium comprising instructions, which, when executed by one or more processors of an electronic device, cause the electronic device to perform operations, including:

determining a list of one or more performance listings of upcoming performances of artists relevant to a first user based on:

a media consumption history of the first user, the media consumption history describing media content items previously delivered to the first user by a media content server; and a listening profile of a second user, distinct from the first user, the listening profile identifying media content and artists played by the second user via the media content server; and providing one or more media items to the first user, the one or more media items selected based on the list of one or more performance listings of the upcoming performances of artists, as determined to be relevant to the first user based on the media consumption history of the first user and the listening profile of the second user.

14. The non-transitory computer-readable storage medium of claim 13, wherein the determination of the list of one or more performance listings is based on a plurality of other users, including the second user, having listening histories similar to the first user.

15. The non-transitory computer-readable storage medium of claim 13, further including instructions for:

adding a first performance to the list of one or more performance listings based on the media consumption history of the first user;

identifying, via the listening profile of the second user, an additional artist associated with a second performance listing, distinct from the first performance listing; and adding the second performance listing to the list of one or more performance listings.

16. The non-transitory computer-readable storage medium of claim 13, further including instructions for:

before providing the one or more media items to the first user, ordering the one or more media items based on a listing chronology of the one or more performance listings.

17. The non-transitory computer-readable storage medium of claim 13, wherein the one or more performance listings correspond to performances scheduled to occur within a predefined window from a current date.

18. The non-transitory computer-readable storage medium of claim 13, wherein providing the one or more media items to the first user includes:

for each respective media item of the one or more media items:

while the respective media item is being played back, displaying performance information associated with a respective performance listing corresponding to the respective media item.

* * * * *